Figure 1:
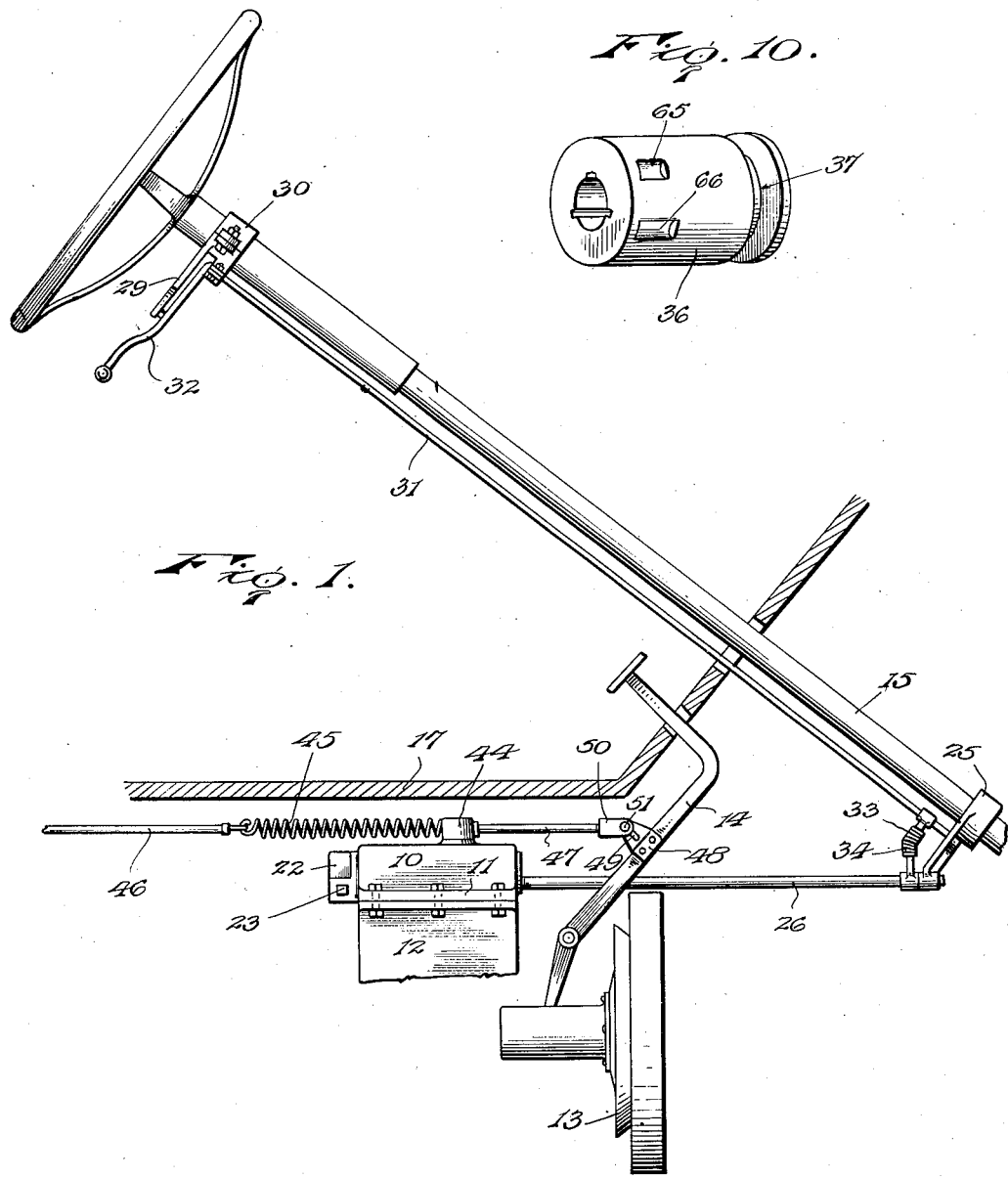

Inventor
G. T. Randol.

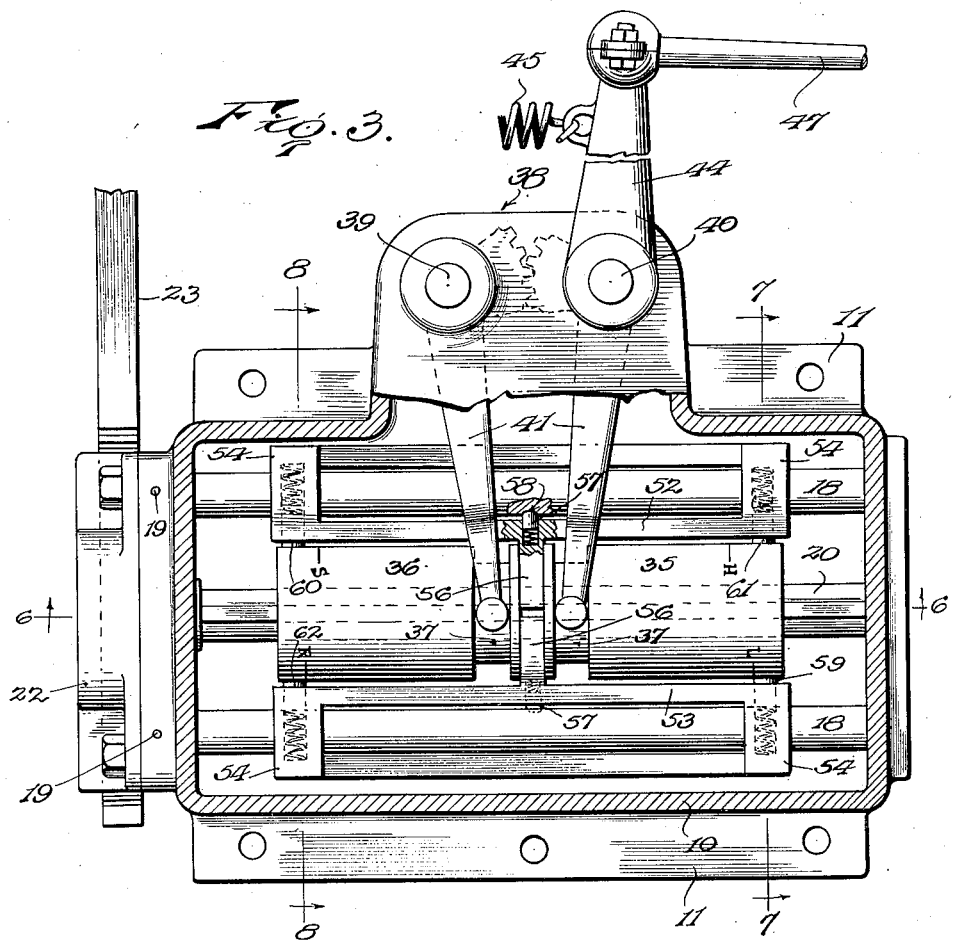
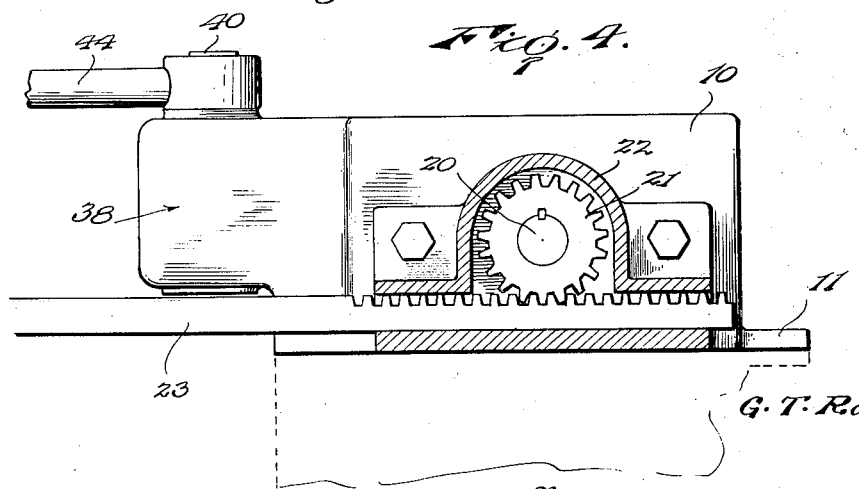

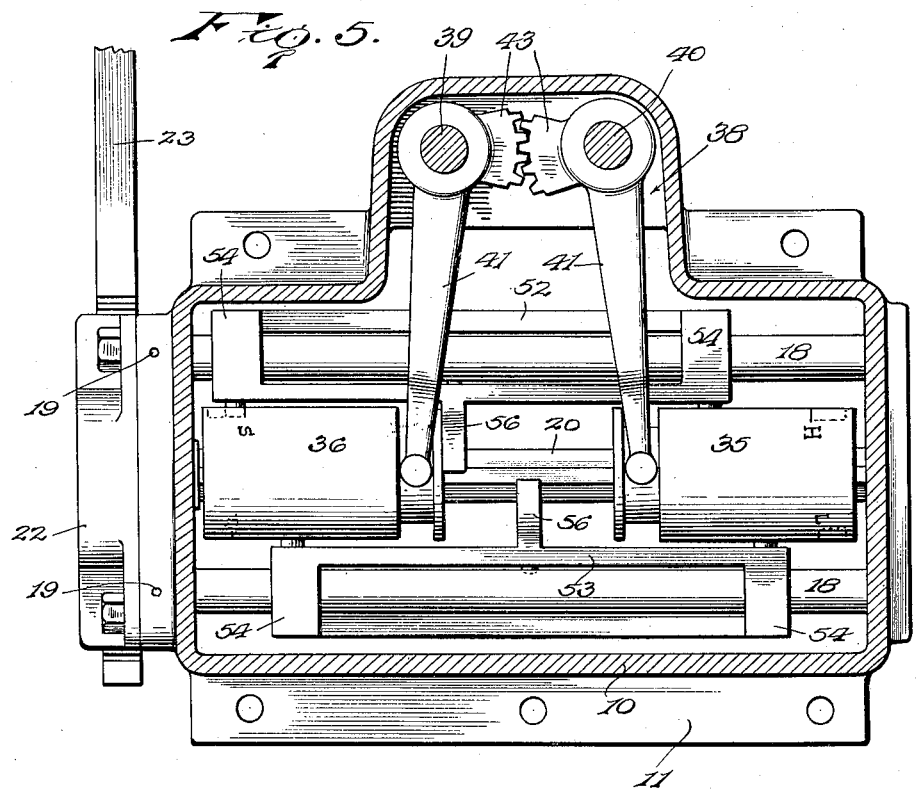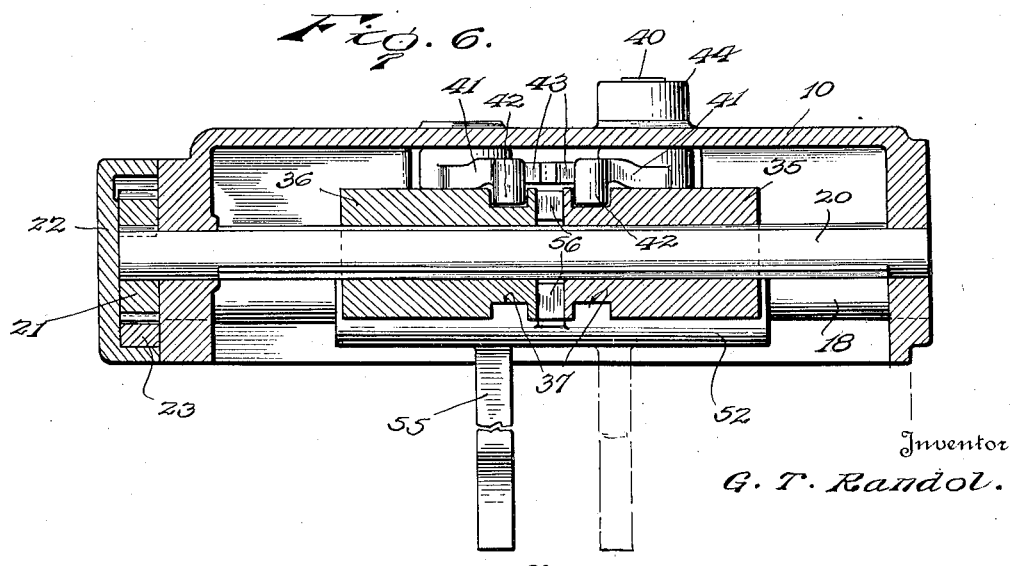

March 9, 1926.

G. T. RANDOL 1,576,065

GEAR SHIFTING MECHANISM

Filed Oct. 25, 1922  5 Sheets-Sheet 5

Inventor
G. T. Randol.

By
Lacy & Lacy, Attorneys

Patented Mar. 9, 1926.

1,576,065

UNITED STATES PATENT OFFICE.

GLENN T. RANDOL, OF MARMADUKE, ARKANSAS, ASSIGNOR OF ONE-HALF TO SOL S. STEINBERG, OF PARAGOULD, ARKANSAS.

GEAR-SHIFTING MECHANISM.

Application filed October 25, 1922. Serial No. 596,838.

*To all whom it may concern:*

Be it known that I, GLENN T. RANDOL, a citizen of the United States, residing at Marmaduke, in the county of Greene and State of Arkansas, have invented certain new and useful Improvements in Gear-Shifting Mechanism, of which the following is a specification.

This invention relates to an improved gear shifting mechanism and seeks, among other objects, to provide a mechanism which may be operated through the medium of the clutch pedal of a motor vehicle while being equally well adapted for actuation by solenoids as exemplified in Patent No. 1,424,784, granted to W. C. Stevens, August 8, 1922.

The invention has as a further object to provide a mechanism wherein, when mechanically connected to the clutch pedal of a vehicle, the work of neutralizing the speed gears will be performed by foot pressure against the clutch pedal while the work of meshing the gears will be performed by spring pressure, energy being stored in the power spring employed through the movement of the clutch pedal for neutralizing the speed gear active.

Another object of the invention is to provide a mechanism especially adapted for use in connection with that form of a motor driven vehicle having a so-called unit power plant in which the selective gear transmission mechanism is interposed directly between the clutch and propeller shaft.

A further object of the invention is to provide a mechanism which is not sensitive in its operation and which may be readily employed in connection with motor vehicles of substantially any conventional design having a selective sliding gear transmission.

A further object is to provide a mechanism wherein there will be positively no danger of injury to the selectors employed when operated during any movement of the clutch pedal and wherein it will be impossible to render any two speed gears active at the same time.

Still anothr object is to provide a mechanism which will be oiled from the transmission casing to which it is applied and which will be of such height that when applied, the device will not interfere with the floor boards of the vehicle nor prove unsightly or in the way.

The invention has as a still further object to provide a mechanism which will require the shortest possible throw of the clutch pedal for its operation and which will eliminate locking devices of any kind for holding the gears in mesh or active position.

In the Stevens patent mentioned, the shifting mechanism is mounted on an auxiliary frame and is connected to the usual shifter rods of the sliding gear transmission by intermediate parts, which parts work loose and hinder the smooth operation of the shifting mechanism while making it difficult to maintain the hand indicator of the device in correct relation to the members of the mechanism to be set. The present invention therefore seeks, as a further object, to overcome these difficulties by providing a mechanism which, in conjunction with the actuating solenoids of the Stevens device, may be secured to the transmission case of a motor vehicle directly over the opening in said casing, thereby accomplishing a very simple and compact installation eliminating the several parts necessary to connect the Stevens mechanism to the transmission shifter rods while tending toward a much smoother and easier operation of the present mechanism under varying road conditions.

Other and incidental objects will appear hereinafter.

Figure 2:
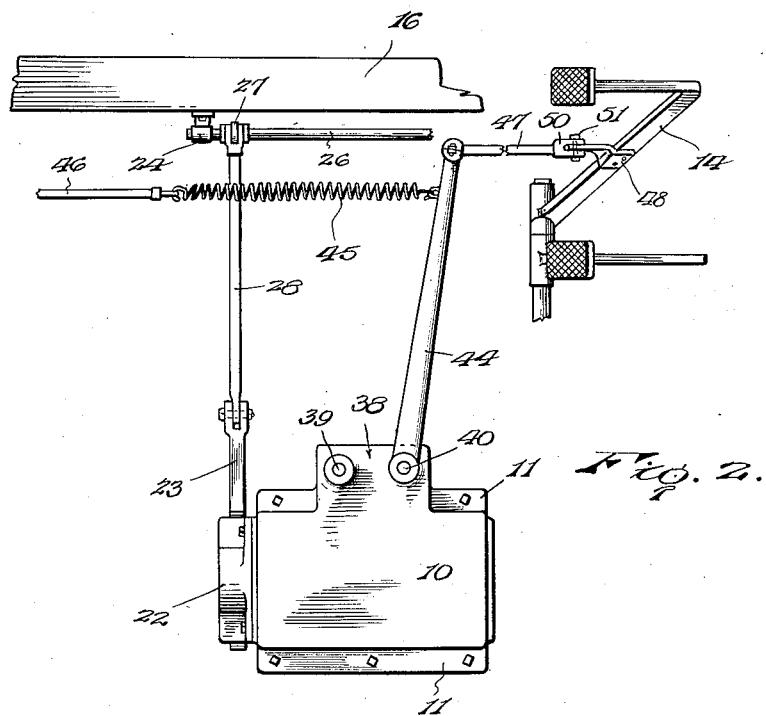
Figure 7:
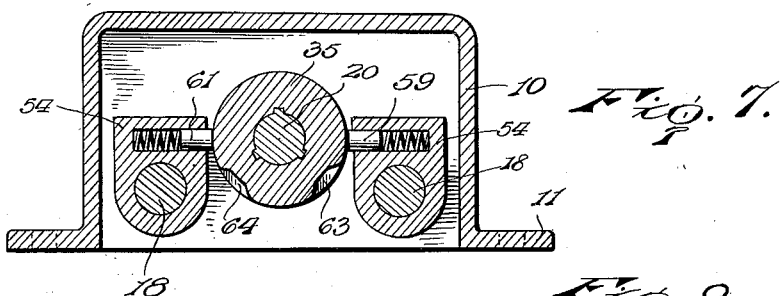
Figure 9:
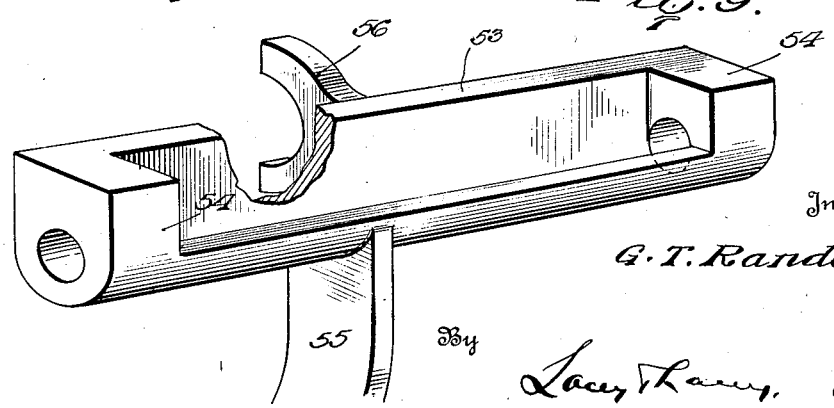
Figure 8:
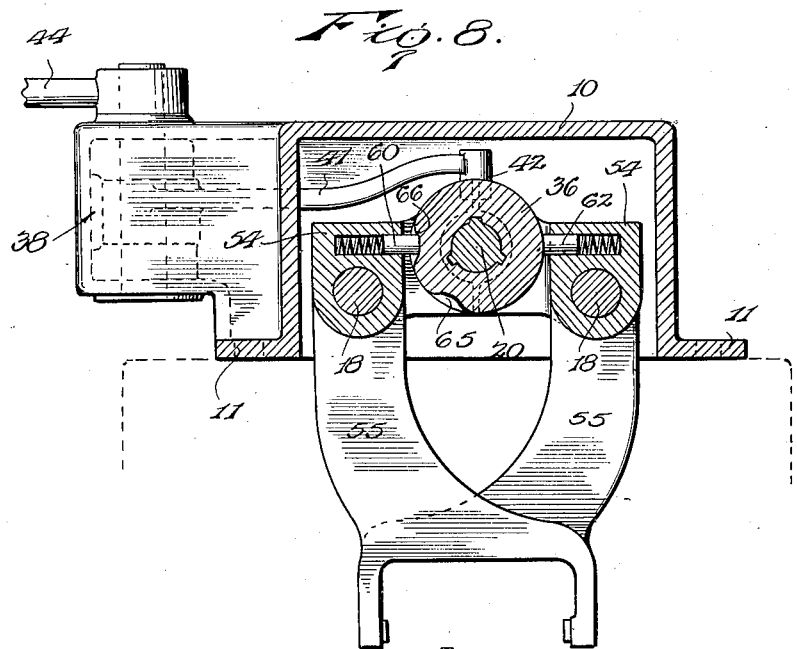
Figure 11:
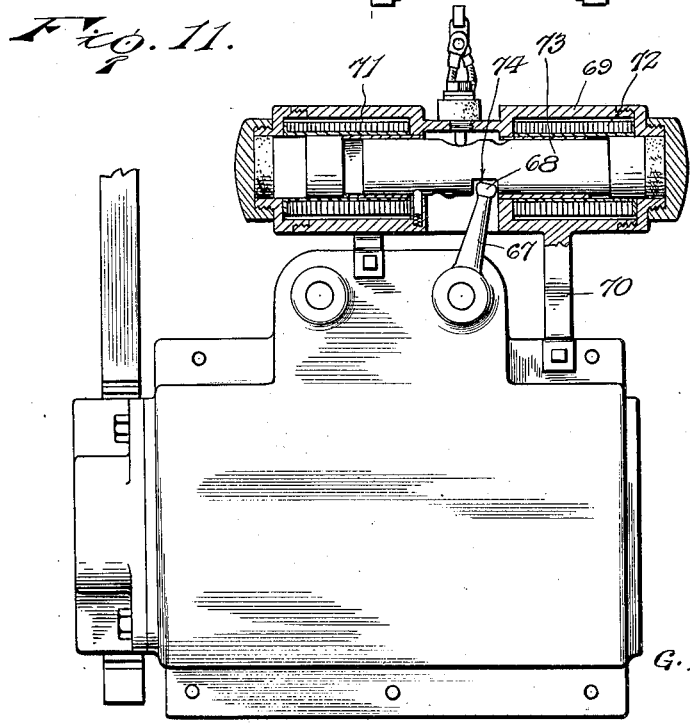

In the drawings:

Figure 1 is a fragmentary elevation showing my improved device applied to the transmission housing of a motor vehicle of conventional design, the floor boards of the vehicle being illustrated in section, Figure 2 is a top plan view of the mechanism, Figure 3 is a horizontal sectional view through the selector casing employed, the selectors being shifted for neutralizing the gears of the transmission, Figure 4 is a detail sectional view particularly showing the selector setting gear of the mechanism, Figure 5 is a view similar to Figure 3, showing the positions of the parts when moved to render the second speed gear of the transmission active, Figure 6 is a vertical longitudinal sectional view on the line 6—6 of Figure 3, looking in the direction of the arrows, Figure 7 is a transverse sectional view on the line 7—7 of Figure 3, looking in the direction of the arrows, Figure 8 is a transverse sectional view on the line 8—8 of Figure 3, looking in the direction of the arrows, Figure 9 is a fragmentary perspective view showing one of the gear shifters of the mechanism, Figure 10 is a perspective view showing one of the selectors of the mechanism, and Figure 11 is a plan view showing the mechanism slightly modified for use in conjunction with actuating solenoids.

In carrying the invention into effect, I employ a casing 10 open at its lower side and provided with flanges 11 so that, as shown in Figure 1, the casing may be bolted to the transmission housing 12 of the vehicle. The housing is, of course, conventionally shown and contains the usual transmission gears. The clutch of the vehicle is conventionally illustrated at 13 and the clutch pedal at 14, while the steering post is indicated at 15. The steering post is, in accordance with common practice, mounted at the left side of the vehicle near the adjacent side bar of the vehicle frame, said side bar being illustrated in Figure 2, at 16. As will be observed, the casing 10 is mounted at the top of the transmission housing 12, occupying the position usually occupied by the mounting for the customary gear shift lever, and is accommodated beneath the floor boards of the vehicle, said floor boards being conventionally illustrated at 17.

Extending longitudinally of the casing are, as clearly shown in Figures 5 and 6, companion stationary shifter rods 18 secured against rotation by pins 19 and arranged in a plane substantially midway between said rods is a selector shaft 20 journaled upon the casing. At one end this shaft extends through the casing and fixed thereon is a pinion 21. Bolted to the casing, to overlie said pinion, is a gear housing 22 and slidable through said housing, as best shown in Figure 4, is a rack bar 23 coacting with the pinion. Secured to the side bar 16 of the vehicle frame is, as shown in Figure 2, a bracket 24. A second bracket 25 is, as shown in Figure 1, mounted upon the steering post 15 and journaled upon said brackets is a shaft 26 to the rear end portion of which is fixed a laterally directed arm 27. Pivotally connected to said arm and to the rack bar 23 is a link 28. Mounted upon the steering post near its upper end is a segment 29 having a split collar 30 surrounding the post and extending between said collar and the bracket 25 is a control rod 31 journaled upon said collar and bracket. At its upper end, this rod is provided with a hand lever 32 extending beneath the segment and fixed to the lower end portion of said rod is a gear sector 33 meshing with a coacting gear sector 34 upon the shaft 26. Thus, as will be seen, the hand lever 32 may be swung for rocking the shaft 26 and shifting the rack bar 23 endwise for rotatably setting the selector shaft 20.

Splined upon the selector shaft 20 are oppositely presented cylindrical selectors which, for convenience, have been indicated at 35 and 36 respectively. At their inner confronting ends, these selectors are, as best brought out in Figure 6, provided with annular channels or grooves 37. Formed on the casing at one side thereof is a medially disposed chamber 38 and journaled through the top and bottom walls of said chamber are shafts 39 and 40. Mounted to rock upon said shafts are selector levers 41 extending over the selectors 35 and 36 and provided at their outer free ends with studs 42 engaging in the channels 37 of the selectors while at their inner ends said levers are formed with meshing sectors 43 projecting from the hubs of the levers. As will be seen, the levers are thus articulated to swing in opposite directions simultaneously. The shaft 40 is somewhat longer than the shaft 39 to project at the upper side of he chamber 38 and fixed to the upper end of said shaft is, as particularly shown in Figures 2 and 3, a lever 44 projecting toward the side bar 16 of the vehicle frame. Secured at one end to the free end of said lever at the rear side thereof is a spring or power device 45, the opposite end of which is attached to a rod 46 or other anchor secured to the vehicle frame so that the spring will thus function to normally hold the lever at the rear end of its throw and, preferably, the rod 40 is adjustable endwise for varying the tension of said spring. Connected to the free end of the lever by a ball and socket joint is a forwardly directed rod 47 lying in a plane with the clutch pedal 14 and secured to said pedal is a plate 48 in which is formed a slot 49. Mounted upon the forward end of said rod is a yoke 50 straddling the plate and extending between the arms of the yoke through said slot is a pin 51 connecting the rod with the plate. The slot 49 is of such length that the clutch pedal may be rocked forwardly, as shown in Figure 1, for the greater portion of its throw for disengaging the clutch 13 without shifting the rod 47 endwise. However, upon further forward movement of the pedal, said rod will be pulled forwardly for swinging the lever 44 and rocking the selector levers 41 while coincidently tensioning the spring 45.

Slidable upon the rods 18 are gear shifters which, for convenience, have been indicated at 52 and 53 respectively. These shifters are, as shown in detail in Figure 9, provided at their ends with sleeves 54 slidably receiving the rods therethrough, the intermediate portions of the shifters being cut away to lighten the weight thereof, and depending from said shifters into the transmission housing 12 are forks 55 coacting with the usual sliding gears of the transmission. Projecting laterally from the shifters medially thereof between the inner ends of the selectors 35 and 36 are neutralizing forks 56 freely straddling the shaft 20 and mounted upon the shifters at said forks are, as particularly shown in Figure 3, spring pressed detents 57 projecting at the inner sides of the shifters to engage in sockets 58 for yieldably locking the shifters in neutral position. Mounted upon the sleeves 54 of the shifters to bear against the selectors 35 and 36, are spring pressed coupling plungers or pawls comprising a low speed plunger 59, a second speed plunger 60, a high speed plunger 61, and a reverse plunger 62. As brought out in Figures 7 and 8, the sleeves are recessed to slidably accommodate said plungers as well as to accommodate the springs behind the plungers so that the plungers will constantly bear against the selectors limited thereby against displacement. Formed in the periphery of the selector 35 near the outer end thereof are, as shown in Figure 7, circumferentially spaced sockets comprising a low speed socket 63 to receive the plunger 59 and a high speed socket 64 to receive the plunger 61, and formed in the periphery of the selector 36 near its outer end are, as shown in Figures 8 and 10, similar sockets comprising a reverse socket 65 to receive the plunger 62 and a second speed socket 66 to receive the plunger 60. All of these sockets are staggered with respect to each other. As will be observed, the side walls of these sockets slope circumferentially of the selectors to the surface thereof so that the plungers may readily ride out of the sockets when the selectors are rotated and, as suggested in Figure 10, the high and second speed sockets 64 and 66 are elongated to accommodate sliding movement of the plungers 60 and 61 endwise of the selectors. The reason for this is that in most vehicle transmissions, the movement of the sliding gears for second and high is not as long as for low and reverse and since the travel of the lever 44 must be the same for the obtaining of the different speed gears, the travel of said lever is determined by the stroke necessary for the longest movement of the sliding gears. The shortest stroke of said gears is accordingly taken care of by elongating said sockets which will allow lost motion of the shifter 52 before the plungers 60 and 61 begin to function.

It is now to be noted that when the clutch pedal 14 is released, the spring 45 will act upon the lever 44 for swinging the lever rearwardly and consequently swinging the free ends of the levers 41 apart so that the selectors 35 and 36 will normally occupy the positions shown in Figure 5. On the other hand, the gear shifters 52 and 53 will normally occupy the centralized position shown in Figure 3, when the gears of the transmission will be in neutral. Under such conditions, it will be assumed that the hand lever 32 is swung to select the second speed gear. When the lever is so swung, the shaft 30 will be turned for rotating the selectors 35 and 36 until the socket 66 of the selector 36 is disposed in horizontal alinement with the plunger 60 of the shifter 52, the plungers riding over the selectors as said selectors are turned. Accordingly, when the clutch pedal 14 is rocked forwardly to the limit of its throw, the lever 44 will, as shown in Figure 3, be swung forwardly with the result that the spring 45 will be tensioned while the free ends of the levers 41 will be swung toward each other for shifting the selectors 35 and 36 toward each other along the shaft 20.

Thus, when the selectors reach the limit of their inward movement, as shown in Figure 3, the plunger 60 will, as shown in Figure 8, drop into the socket 66 of the selector 36 coupling the shifter 52 with said selector so that upon release of the clutch pedal, the spring 45 will swing the lever 44 rearwardly with the result that, as shown in Figure 5, the free ends of the levers 41 will be swung apart for shifting the selectors away from each other along the shaft 20 and moving the shifter 52 rearwardly to engage the second speed gear, the fork 55 of said shifter functioning, of course, to slide said gear to active position. As will be perceived, the spring 45 will then hold the second speed gear active. In like manner, the hand lever 32 may be swung to select the reverse gear when the selectors 35 and 36 will be turned until the socket 65 of the selector 36 is brought into alinement with the plunger 62 of the shifter 53. Accordingly, when the clutch pedal is then rocked to the limit of its forward throw, the selector 53 will be moved rearwardly for rendering the reverse gear active. Similarly, the hand lever may be set to select either low speed or high speed, when the selectors 35 and 36 will be turned until the socket 63 of the selector 35 is brought into alinement with the plunger 59 for low speed or until the socket 64 of said selector is brought into alinement with the plunger 61 for high speed. Accordingly, when the clutch pedal is then rocked, the shaft 53 will be moved forwardly when the low speed gear is selected while, when the high speed gear is selected, the shifter 52 will be moved forwardly. When the hand lever 32 is set at neutral no one of the sockets of the selectors will be brought into alinement with any of the plungers so that when the clutch pedal is rocked no gear will be shifted and, in this connection, it is to be noted that since, as previously stated, the sockets are all staggered with respect to each other while the plungers of the shifters lie in a plane common thereto, it will be impossible to set the selectors in such manner that any two of the sockets will be brought into alinement with any two of the plungers at the same time. Accordingly, it will be impossible to select more than one gear at any one setting of the hand lever 32 and, in this connection, it is to be noted that, as brought out in Figure 5, when either of the shifters 52 and 53 is moved for rendering one of the speed gears of the transmission active, the other of said shifters will remain stationary. For this reason, the shifters are equipped with the detents 57 so that the inactive shifter will be held against endwise movement such as might be caused through jolting of the vehicle equipped with the mechanism.

Assuming now that one of the speed gears of the transmission is active, as for instance, the second speed gear, it is to be noted that even though the plunger 60 is engaged in the socket 66 of the selector 36, the hand lever 32 may be set for selecting another speed gear of the transmission. When the hand lever is thus set and the selectors are rotated, the plunger 60 will ride over the adjacent sloping side wall of the socket 66 onto the surface of the selector 36 uncoupling the shifter 52 from said selector. However, when the clutch pedal is then rocked forwardly to shift the gear selected, the inner end of the selector 36 will, as the selectors are moved toward each other to the position shown in Figure 3, coact with the fork 56 of said shifter for returning the shifter to neutral position. Consequently, before the selected gear can be shifted to active position, the second speed gear previously selected, in the instance taken, will be neutralized. The selector 35 will, of course, function in like manner with the fork 56 of the shifter 53 for neutralizing this shifter so that, as will be seen, when the clutch pedal is rocked forwardly by foot pressure, any gear previously active will be shifted to inactive position while, when the clutch pedal is released, any gear selected will be shifted to active position by the spring 45. I accordingly provide a mechanism wherein a gear selected cannot be shifted to active position before any previously selected gear is rendered inactive while the hand lever may be set when any gear is active to select another gear or to effect the neutralizing of the transmission.

In Figure 11 of the drawings, I have illustrated a slight modification of the invention adapting the mechanism for actuation by solenoids, as illustrated in the patent of Stevens herein identified. In this modification, the gear shifting mechanism is identical with that disclosed in connection with the preferred construction with the exception that the operating lever of the mechanism, indicated at 67, is shorter and is provided at its free end with a head 68, the lever 67 corresponding to the lever 44 previously described. Mounted adjacent the free end of said lever is a solenoid housing 69 and connecting said housing with the casing of the mechanism are arms 70. Arranged within the housing are solenoids 71 and 72 and associated with said solenoids is a core 73 common thereto. Formed in said core at a point substantially midway between the ends thereof is a notch 74 receiving the head 68 of the lever 67. The solenoid construction as thus described, is identical with that disclosed in the Stevens patent mentioned and it is accordingly unnecessary to herein enter into a detailed description of the operation of the solenoids. On the other hand, it is sufficient to note that when the core 73 of the solenoids is shifted, the lever 67 will be swung therewith for actuating the gear shifting mechanism.

Having thus described the invention, what is claimed as new is:

1. A gear shifting mechanism including selecting means, gear shifting means movable by said selecting means, yieldable coupling means for detachably connecting said shifting means with said selecting means for movement thereby, the selecting means being rotatable, and means for rotatably setting said selecting means to coact with said coupling means whereby to select a gear to be shifted.

2. A gear shifting mechanism including companion selectors, gear shifting means movable in opposite directions by said selectors respectively, companion yieldable coupling means for detachably connecting said shifting means with said selectors for movement thereby, the selectors being rotatable, and means for rotatably setting said selectors to position one of said selectors to coact with one of said coupling means whereby to select a gear to be shifted.

3. A gear shifting mechanism including companion selectors, gear shifting means movable in opposite directions by said selectors respectively, companion yieldable coupling means for detachably connecting said shifting means with said selectors for movement thereby, the selectors being rotatable, and means for rotatably setting said selector simultaneously for positioning one of said selectors to coact with one of said coupling means whereby to select a gear to be shifted.

4. A gear shifting mechanism including selecting means, companion gear shifters movable in opposite directions by said selecting means, companion yieldable coupling means for detachably connecting said shifters with said selecting means for movement thereby, the selecting means being rotatable, and means for rotatably setting said selecting means to coact with one of said coupling means whereby to select a gear to be shifted.

5. A gear shifting mechanism including selecting means, companion gear shifters movable in opposite directions by said selecting means, yieldable coupling means upon each of said shifters for detachably connecting said shifters with said selecting means for movement thereby, the selecting means being rotatable, and means for rotatably setting said selecting means to coact with one of said coupling means whereby to select a gear to be shifted.

6. A gear shifting mechanism including companion selecting means, companion gear shifting means movable in opposite directions by said selecting means respectively, yieldable coupling means upon each of said shifting means for detachably connecting said shifting means with said selecting means for movement thereby, the selecting means being rotatable, and means for rotatably setting said selecting means to position one of said selecting means to coact with one of said coupling means whereby to select a gear to be shifted.

7. A gear shifting mechanism including companion selectors, companion gear shifters movable in opposite directions by said selectors respectively, yieldable coupling means upon each of said shifters for detachably connecting said shifters with said selectors for movement thereby, the selectors being rotatable, and means for rotatably setting said selectors to position one of said selectors to coact with one of said coupling means whereby to select a gear to be shifted.

8. A gear shifting mechanism including companion selecting means, gear shifting means movable in one direction by one of said selecting means and in the opposite direction by another of said selecting means, companion yieldable coupling means for detachably connecting said shifting means with said selecting means for movement thereby, the selecting means being rotatable, and means for rotatably setting said selecting means to position one of said selecting means to coact with one of said coupling means whereby to select a gear to be shifted.

9. A gear shifting mechanism including companion selectors, companion gear shifters each movable in one direction by one of said selectors and in the opposite direction by another of said selectors, companion yieldable coupling means upon said shifters to cooperate with said selectors respectively for detachably connecting said shifters with said selectors for movement thereby, the selectors being rotatable, and means for rotatably setting said selectors to position one of said selectors to coact with one of said coupling means whereby to select a gear to be shifted.

10. A gear shifting mechanism including companion selectors, gear shifting means movable in one direction by one of said selectors and in the opposite direction by another of said selectors, means for shifting said selectors in opposite directions simultaneously, companion yieldable coupling means for detachably connecting said shifting means with said selectors for movement thereby, the selectors being rotatable, and means for rotatably setting said selectors to coact with one of said coupling means whereby to select a gear to be shifted.

11. A gear shifting mechanism including companion selectors, companion gear shifters each movable in one direction by one of said selectors and in the opposite direction by another of said selectors, means for shifting said selectors in opposite directions simultaneously, companion yieldable coupling means upon each of said shifters to cooperate with said selectors respectively for detachably connecting said shifters with said selectors for movement thereby, the selectors being rotatable, and means for rotatably setting said selectors to position one of said selectors to coact with one of said coupling means whereby to select a gear to be shifted.

12. A gear shifting mechanism including companion selectors, gear shifting means, companion yieldable coupling means to cooperate with said selectors respectively for detachably connecting said shifting means with one of said selectors for movement thereby in one direction and detachably connecting said shifting means with another of said selectors for movement thereby in the opposite direction, means for shifting the selectors in opposite direction simultaneously, means carried by said shifting means engageable by said selectors for returning said shifting means to neutral position when freed by said coupling means, and means for setting said selectors to position one of the selectors to coact with one of said coupling means whereby to select a gear to be shifted.

13. A gear shifting mechanism including companion selectors, companion gear shifters, companion yieldable coupling means upon each of said shifters to cooperate with said selectors respectively for detachably connecting each of said shifters with one of said selectors for movement thereby in one direction and detachably connecting each of said shifters with another of said selectors for movement thereby in the opposite direction, means for shifting the selectors in opposite directions simultaneously, means carried by said shifters engageable by said selectors for returning the shifters to neutral position when freed by said coupling means, and means for setting for selectors to position one of said selectors to cooperate with one of said coupling means whereby to select a gear to be shifted.

14. A gear shifting mechanism including rotatable selecting means, gear shifting means, yieldable coupling means urged to active position for detachably connecting said shifting means with said selecting means for movement thereby, means carried by said shifting means for engagement by said selecting means to return said shifting means to neutral position when freed by said coupling means, means for shifting said selecting means, and means for setting said selecting means to coact with said coupling means whereby to select a gear to be shifted.

15. A gear shifting mechanism including selecting means, gear shifting means movable by said selecting means for rendering a selected gear active, yieldable means acting on said selecting means for holding the gear active, and means for setting said selecting means while said gear is active to select a future gear.

16. A gear shifting mechanism including selecting means, gear shifting means movable by said selecting means, yieldable means urging the selecting means in one direction for rendering a selected gear active held active by said selecting means, said selecting means being operatively engageable with said shifting means upon the return of said selecting means for returning said gear to neutral position, and means for setting said selecting means while said gear is active for selecting a future gear.

17. A gear shifting mechanism including selecting means, gear shifting means movable by said selecting means, companion yieldable coupling means for detachably connecting said shifting means with said selecting means for movement thereby, the selecting means being movable in one direction coacting with said coupling means for shifting a selected gear and being operatively engageable with said shifting means upon return of said selecting means for returning said gear to neutral position, and means for setting the selecting means while said gear is active to cooperate with a future one of said coupling means whereby to select a future gear.

18. A gear shifting mechanism including companion rotatable selectors, companion gear shifters, yeldable coupling means urged to active position for detachably connecting said shifters with said selectors for movement thereby, means carried by said shifters engageable by said selectors for returning the shifters to neutral position when freed by said coupling means, and means for setting said selectors to coact with said coupling means whereby to select a gear to be shifted.

19. A gear shifting mechanism including gear shifting means, selecting means movable for shifting said shifting means to render a gear active, yieldable means acting on said selecting means for holding the gear active, the selecting means being rotatable, and means for rotatably setting said selecting means while said gear is active to select a future gear.

20. A gear shifting mechanism including gear shifting means, rotatable selecting means movable for shifting said shifting means in one direction to render a gear active, said shifting means being provided with means for engagement by said selecting means for shifting said shifting means in the opposite direction upon return movement of said selecting means, and yieldable coupling means urged to active position for detachably connecting said selecting means with said shifting means.

21. A gear shifting mechanism including a gear shifter, a rotatable selector movable for shifting said shifter in one direction to render a gear active, the shifter being provided with means for engagement by said selector for shifting said shifter in the opposite direction upon return movement of said selector, and yieldable coupling means urged to active position for detachably connecting said selector with said shifter.

22. A gear shifting mechanism including selecting means, gear shifting means movable by the selecting means, yieldable coupling means carried by the shifting means to bear against the selecting means, and means for setting the selecting means for active engagement by said coupling means.

23. A gear shifting mechanism including selecting means, gear shifting means movable by the selecting means, yieldable coupling means carried by the shifting means to bear against the selecting means, the selecting means being rotatable, and means for rotatably setting the selecting means for active engagement by the coupling means.

24. A gear shifting mechanism including selecting means, gear shifting means movable by the selecting means, yieldable coupling means carried by the shifting means to bear against the selecting means, and means for setting the selecting means for active engagement by the coupling means, the selecting means being movable to free the coupling means from active engagement with the selecting means.

25. A gear shifting mechanism including selecting means, gear shifting means movable by the selecting means, yieldable coupling means carried by the shifting means to bear against the selecting means, the selecting means being rotatable, and means for rosaid selecting means.

26. A gear shifting mechanism including a selector, a gear shifter movable by the selector, spring pressed coupling means carried by the shifter to bear against the selector, and means for setting the selector for active engagement by said means.

27. A gear shifting mechanism including a selector, a gear shifter movable by the selector, spring pressed coupling means carried by the shifter to bear against the selector, the selector being rotatable, and means for rotatably setting the selector for active engagement by said means.

28. A gear shifting mechanism including a selector, a gear shifter movable by the selector, spring pressed coupling means carried by the shifter to bear against the selector, the selector being rotatable, and means for rotatably setting the selector for active engagement by said means, the selector being rotatably movable to ride said coupling means out of active engagement therewith.

29. A gear shifting mechanism including selecting means, gear shifting means movable by the selecting means, yieldable coupling means carried by the shifting means to bear against the selecting means, means for setting the selecting means for active engagement by said coupling means or to render the coupling means inactive freeing the shifting means, and means carried by the shifting means for engagement by the selecting means for returning the shifting means when freed.

30. A gear shifting mechanism including a selector, a gear shifter movable by the selector, spring pressed coupling means carried by the shifter to bear against the selector, the selector being rotatable, means for rotatably setting the selector for active engagement by said coupling means or to render said coupling means inactive freeing the shifter, and means carried by the shifter for engagement by said selector to return the shifter when freed.

31. A gear shifting mechanism including a selector, a gear shifter movable by the selector, a spring pressed coupling plunger carried by the shifter to bear against the selector, the selector being rotatable and being provided with a socket, and means for rotatably setting said selector to a position for receiving said plunger in said socket coupling the selector and shifter or to ride the plunger out of the socket freeing the shifter.

32. A gear shifting mechanism including a selector, a gear shifter movable by the selector, a spring pressed coupling plunger carried by the shifter to bear against the selector, the selector being rotatable and being provided with a socket, means for rotatably setting said selector to a position for receiving said plunger in said socket coupling the selector and shifter or to ride the plunger out of the socket freeing the shifter, and an element carried by the shifter for engagement by the selector for returning the shifter when freed.

33. A gear shifting mechanism including parallel rods, a shaft mounted in a plane between the rods, companion selectors slidable upon the shaft but mounted to turn therewith, means for shifting the selectors along the shaft, spring pressed coupling plungers carried by the shifters to bear against the selectors, and means for rotating said shaft and setting the selectors for active engagement by said plungers respectively.

34. A gear shifting mechanism including parallel rods, a shaft mounted in a plane between the rods, companion selectors slidable upon the shaft but mounted to turn therewith, means for shifting the selectors along the shaft, spring pressed coupling plungers carried by the shifters to bear against the selectors, means for rotating said shaft and setting the selectors for active engagement by said plungers respectively or for riding any one of the plungers out of active engagement with a selector to free either shifter respectively, and means carried by the shifters for engagement by the selectors for returning either shifter when freed.

35. A gear shifting mechanism including a casing, a shaft rotatable thereon, a selector mounted to turn with the shaft but slidable thereon, a rod carried by the casing adjacent said shaft, a shifter slidable upon said rod, yieldable coupling means carried by the shifter to bear against the selector, a pinion carried by said shaft, a housing for said pinion, and a rack bar slidable in the housing to coact with the pinion and operable for rotating the shaft and setting the selector for active engagement by said coupling means.

36. A gear shifting mechanism including companion selectors, gear shifters movable by the selectors, yieldable coupling means carried by the shifters to bear against the selectors, means for setting the selectors for active engagement by said means, and pivoted levers coacting with the selectors and articulated to swing in opposite directions simultaneously for shifting the selectors.

37. A gear shifting mechanism including selecting means, gear shifting means movable by the selecting means, yieldable coupling means carried by one of the former means and urged toward active position to bear against the other of the former means, and means for setting the selecting means whereby to effect the coupling of the selecting means and gear shifting means by said coupling means.

38. A gear shifting mechanism including selecting means, gear shifting means movable by the selecting means, yieldable coupling means carried by one of the former means and urged toward active position to bear against the other of the former means, the selecting means being rotatable, and means for rotatably setting the selecting means whereby to effect the coupling of the selecting means and gear shifting means by said coupling means.

39. A gear shifting mechanism including selecting means, gear shifting means movable by the selecting means, coupling means urged toward active position to form a yieldable connection between the selecting means and said gear shifting means, the selecting means being rotatable, and means for rotatably setting said selecting means whereby to effect the coupling of the selecting means and gear shifting means by said coupling means.

40. A gear shifting mechanism including rotatable selecting means, means for rotatably setting said selecting means, gear shifting means movable by the selecting means, and means for yieldably coupling said selecting means with said gear shifting means whereby the selecting means may be set irrespective of the relative positions of the parts.

41. A gear shifting mechanism including rotatable selecting means, means for rotatably setting said selecting means, gear shifting means movable by the selecting means, and yieldable coupling means for connecting said selecting means with said gear shifting means whereby the selecting means may be set irrespective of the relative positions of the parts.

42. A gear shifting mechanism including rotatable selecting means, means for rotatably setting said selecting means, gear shifting means movable by the selecting means for rendering a selected gear active, and yieldable means for coupling said selecting means with said gear shifting means whereby the selecting means may be set irrespective of the position of the selected gear.

43. A gear shifting mechanism including rotatable selecting means, means for rotatably setting said selecting means, gear shifting means movable by the selecting means for rendering a selected gear active, and yieldable means for coupling said selecting means with said gear shifting means whereby the selecting means may be set when said gear is active to select a future gear or to select a neutralization of the mechanism.

44. A gear shifting mechanism including rotatable selecting means, means for rotatably setting said selecting means, gear shifting means movable by the selecting means for rendering a selected gear active or for neutralizing said gear, a foot pedal for shifting said selecting means to neutralize the gear, and yieldable means for coupling said selecting means with said gear shifting means whereby the selecting means may be set irrespective of the position of the pedal.

45. A gear shifting mechanism including rotatable selecting means, means for rotatably setting said selecting means, gears shifting means movable by said selecting means, a power device for shifting said selecting means, and yieldable means for coupling said selecting means with said gear shifting means whereby the selecting means may be set irrespective of the relative positions of the parts.

46. A gear shifting mechanism including companion rotatable selectors, means for rotatably setting said selectors, gear shifters movable by said selectors, the selectors being movable toward each other for neutralizing a selected gear and away from each other for rendering a selected gear active, and yieldable means for coupling said selectors with said gear shifters whereby the selectors may be set irrespective of the relative positions of the parts.

In testimony whereof I affix my signature.

GLENN T. RANDOL. [L. S.]